(No Model.) 2 Sheets—Sheet 1.

F. MÜLLER.
DRIVING ATTACHMENT OR POWER TRANSMITTER.

No. 468,357. Patented Feb. 9, 1892.

Witnesses:
A. W. Cushman.
C. M. Sweeney.

Inventor:
Friederich Müller,
by Henry Calver,
Atty.

(No Model.) 2 Sheets—Sheet 2.
F. MÜLLER.
DRIVING ATTACHMENT OR POWER TRANSMITTER.
No. 468,357. Patented Feb. 9, 1892.
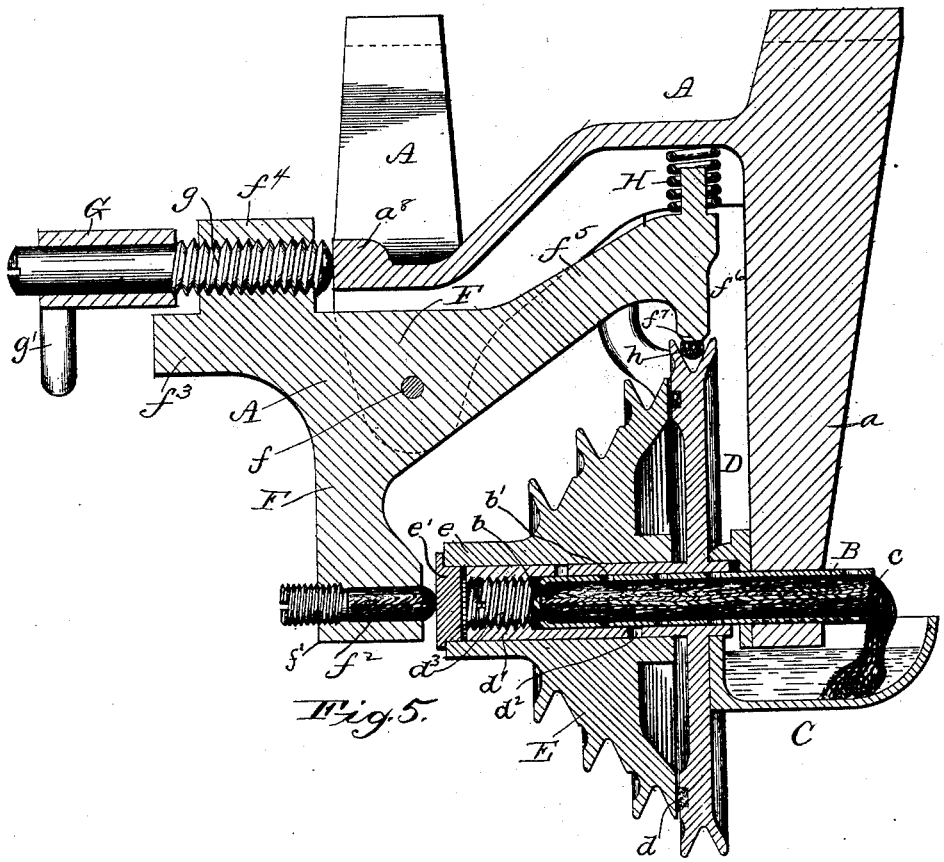
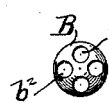
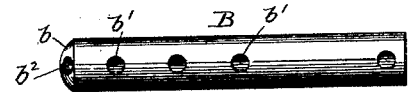
Witnesses:
A. Cushman.
C. M. Sweeney.
Inventor:
Frederich Müller,
by Henry Calvert,
Atty.

UNITED STATES PATENT OFFICE.

FRIEDERICH MÜLLER, OF ELIZABETH, NEW JERSEY, ASSIGNOR TO THE SINGER MANUFACTURING COMPANY OF NEW JERSEY.

DRIVING ATTACHMENT OR POWER-TRANSMITTER.

SPECIFICATION forming part of Letters Patent No. 468,357, dated February 9, 1892.

Application filed June 23, 1891. Serial No. 397,231. (No model.)

*To all whom it may concern:*

Be it known that I, FRIEDERICH MÜLLER, a citizen of the United States, residing at Elizabeth, in the county of Union and State of New Jersey, have invented certain new and useful Improvements in Driving Attachments or Power-Transmitters, of which the following is a specification, reference being had therein to the accompanying drawings.

My invention has for its object to provide a convenient mechanism by which power may be transmitted from a constantly-running pulley to a driven pulley from which sewing or other similar small machines may be operated.

My improved driving device or "under driver" is intended to be applied beneath a bench or work-table, on which the machine to be driven is placed, and it is provided with a suitable treadle-operated mechanism by which the constantly-running pulley may be forced into frictional contact with the pulley to be driven. The driven pulley is preferably mounted on a sleeve, in which is inserted an oil-conducting wick extending into an oil-cup, the said sleeve being provided with perforations, through which the oil can escape to lubricate the bearing of the said driven pulley, and the latter is also provided with a perforated sleeve, on which is mounted the constantly-running driving-pulley and through which the oil can escape to lubricate the bearing of the latter. The perforated sleeve supporting the driven pulley is secured to a suitable bracket attached to the under side of the table, and to the said bracket is pivoted a three-armed lever, one arm of which may be impinged against the hub of the driving-pulley to force the latter into frictional contact with the driven pulley and another arm of which is provided with a brake which will impinge against the driven pulley to arrest the movement of the same when the first-named arm is released from the driving-pulley, all as will hereinafter be more fully explained.

Figure 1:
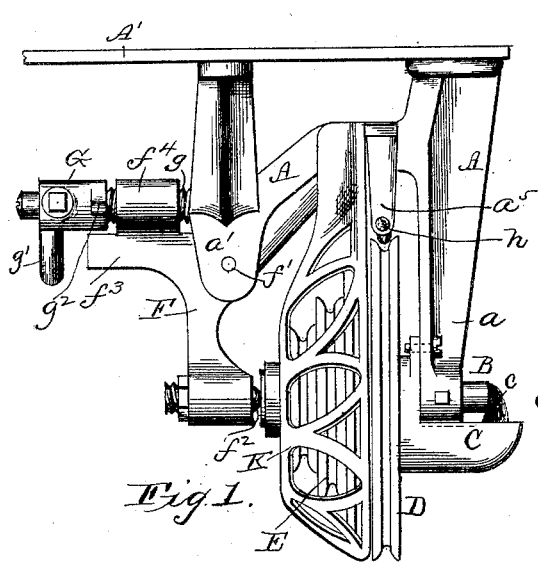
Figure 2:
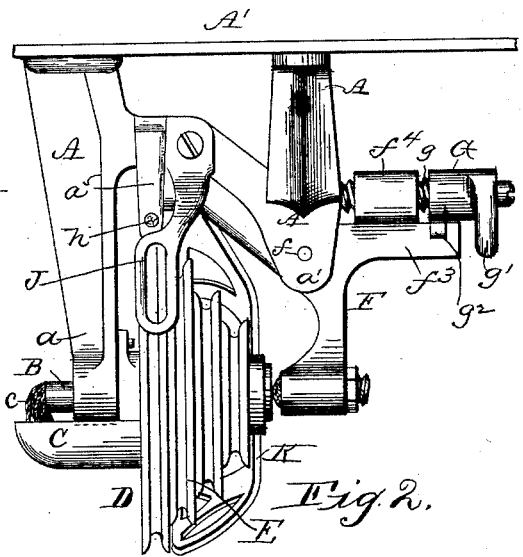
Figure 3:
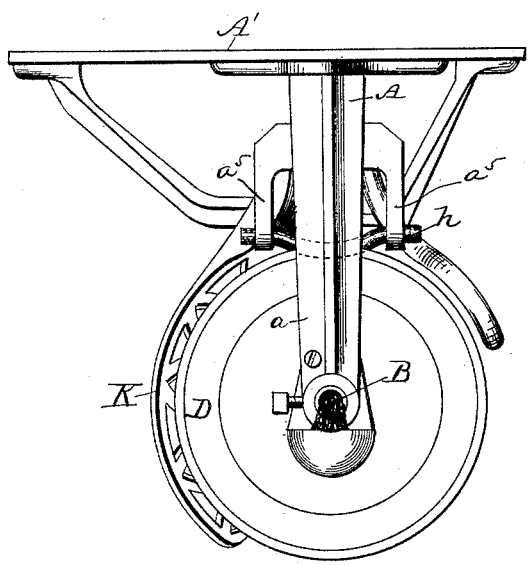
Figure 4:
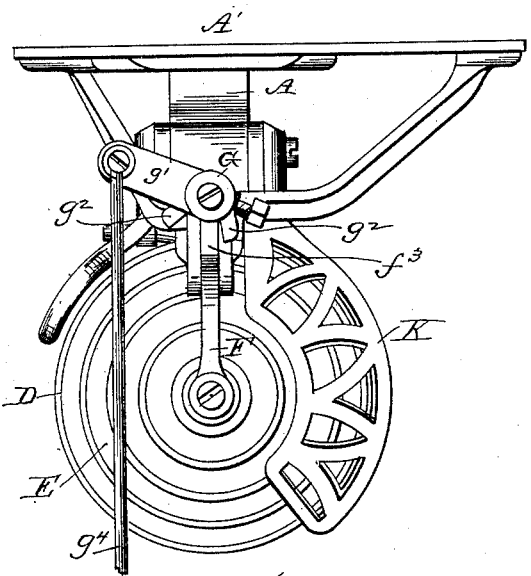

In the accompanying drawings, Figures 1 and 2 are opposite side elevations of my improved attachment. Figs. 3 and 4 are opposite end views thereof. Fig. 5 is a vertical section. Fig. 6 is a detail view of the brake. Figs. 7 and 8 are end and side views, respectively, of the sleeve which supports the driven pulley.

A denotes a suitable metal bracket which is to be attached to the under side of the table A', on which the machine to be driven is mounted. Secured to a depending arm $a$ of the bracket A is a sleeve B, having a rounded or conical inner end $b$. The said sleeve B is provided with a series of radial perforations $b'$, and its rounded inner end $b$ is also provided with perforations $b^2$, preferably four in number, as shown in the detail view, Fig. 7, which leave the central portion of said end intact. Through the perforations $b^2$ is drawn a suitable oil-conducting wick $c$, the end of which extends into an oil-cup C, supported by the said sleeve B. On the sleeve B is mounted the driven pulley D, the inner face of which is grooved to receive a friction-ring $d$, of leather or other suitable material, and the said driven pulley is also provided with a sleeve $d'$, mounted on the said sleeve B and having one or more oil-holes $d^2$. A plug $d^3$, having a flat inner face, is screwed into the end of the said sleeve $d'$ of the pulley D, the said flat inner end of said plug being, when the said pulley is to be driven, forced into contact with the rounded inner end of the sleeve B. On the sleeve $d'$ of the said driven pulley is mounted the driving cone-pulley E, which is provided with a sleeve $e$, having at its outer end a plug $e'$. From the construction above described it will be apparent that the bearing of the driven pulley on the sleeve B and the bearing of the driving-pulley on the sleeve $d'$ will be properly lubricated from the oil-cup, so that the said pulleys will always run smoothly and easily.

Pivoted at $f$ to a depending lug $a'$ of the bracket A is a three-armed lever F, the lower or vertical arm of which is provided with a rounded projection consisting, preferably, of a wooden plug $f^2$, which is to impinge against the plug $e'$ of the driven pulley E when said driving-pulley is to be forced into frictional contact with the driven pulley D. Thus when the said driving and driven pulleys are in frictional contact with each other, so as to run together, they will be held between two stationary rounded parts—to wit, the rounded wooden plug $f^2$ and the rounded end $b$ of the sleeve B—so that the stationary parts between which these two pulleys (which practically form one pulley when they are running) are held will cause but little friction thereon, and they will therefore run easily.

The arm $f^3$ of the lever F is provided with an internally-threaded sleeve $f^4$, entered by a threaded screw $g$, rigid with a hub G, the said hub being provided with an arm $g'$ and with lugs $g^2$, which are on opposite sides of said arm $f^3$, so that the said lugs by engaging with said arm serve as stops to limit the turning movements of the hub G. The inner end of the screw $g$ simply impinges against a lug or projection $a^8$ on the bracket A, so that when the said screw is partly turned it causes the plug $f^2$, carried by the arm $f'$, to impinge against the plug $e'$ of the driving-pulley E, and thus forces said driving-pulley into contact with the driven pulley.

To the arm $g'$ is connected a rod or pitman $g^4$, which is to be operated by a suitable treadle. (Not shown.)

The lever F is provided with a second arm $f^5$, having at its end a suitable brake portion $f^6$, which is to arrest the movement of the driven pulley D when the driving-pulley is released from frictional contact therewith. This brake consists, as herein shown, of a strip of leather $h$, the ends of which are extended through holes in depending lugs $a^5$, formed on the bracket A, and to prevent endwise movement of this strip of leather the brake portion $f^6$ of the lever F is provided with a tooth or projection $f^7$, which sinks into the leather strip and holds it from moving endwise. This leather strip as a brake has been substituted for the ordinary wooden brake-surface, for the reason that the latter produced an objectionable squeaking when the driven pulley was stopped, such squeaking not occuring when the leather strip is used. A spring H, which presses upon the upper side of the arm $f^5$, serves normally to throw said arm down to apply the brake to the driven wheel when the driving-wheel is released therefrom.

The screw $g$ turns in the sleeve $f^4$ with sufficient friction so that the hub G will remain in any position to which it may be turned until it is moved from such position by the operator, and it will not therefore be necessary for the operator to constantly apply pressure to the treadle to keep the driving-pulley in contact with the driven pulley, as is necessary with some forms of driving attachments now in use. In other words, the power may be applied by the operator and will continue to be applied without any further effort on his or her part until the treadle shall again be operated to release the driving-pulley from the driven pulley. This friction of the screw $g$ in its sleeve $f^4$ is partly caused by the pressure of the stiff spring H, which forces the brake into contact with the driven pulley.

To prevent the belt which runs from the driven pulley to the machine on the table from escaping over said pulley, I prefer to provide my improved pulley with a belt-guide J.

I claim—

1. In a driving attachment, the combination, with driving and driven pulleys, both of which are loosely journaled on their supports, so as to turn freely thereon, of a lever for forcing said pulleys into frictional contact with each other and a screw by which said lever is operated, said screw extending through an arm or portion of said lever and abutting against a stationary stop.

2. In a driving attachment, the combination, with suitably-mounted driven and driving pulleys, of a three-armed lever, one arm of which serves to force said pulleys into frictional contact with each other, the second arm of which is provided with a brake to arrest the movement of the driven pulley when the driving-pulley is released therefrom, and the third arm of which is provided with a screw to operate said lever.

3. In a driving attachment, the combination, with a perforated sleeve provided with an oil-wick, of an oil-cup into which said wick extends, a driven pulley mounted on said sleeve and provided in turn with a perforated sleeve, a driving-pulley mounted on the last-named sleeve, and a screw-operated lever for forcing said driving-pulley into contact with said driven pulley.

4. The combination, with a sleeve B, provided with a rounded end $b$, of a driven pulley D, mounted on said sleeve and provided with a sleeve $d'$, having a plug $d^3$ to impinge against the rounded end of said sleeve B, a driving-pulley E, mounted on said sleeve $d'$ and having a plug or bearing portion $e'$ at its outer end, and a lever F, having a rounded projection, as plug $f^2$, to impinge against the bearing portion of the said driving-pulley.

5. In a driving attachment, the combination, with suitably-mounted driving and driven pulleys, of a lever by which said pulleys are forced into contact with each other, said lever being provided with a brake-arm having a tooth or projection, and a strip of leather which serves as a brake-surface and which is held from sidewise movement by the said brake tooth or projection.

6. In a driving attachment, the combination, with suitably-mounted driving and driven pulleys and a lever for forcing said pulleys into contact with each other, of a brake for arresting the driven pulley when the driving-pulley is released therefrom, and a belt-guide to prevent the belt running to said driven pulley from escaping therefrom.

7. In a driving attachment, the combination, with suitably-mounted driving and driven pulleys, of a lever for forcing said pulleys into frictional contact with each other, a screw for operating said lever, and a hub by which said screw is carried and which is provided with stops to limit its movement in either direction, substantially as set forth.

In testimony whereof I affix my signature in presence of two witnesses.

FRIEDERICH MÜLLER.

Witnesses:
L. B. MILLER,
PHILIP DIEHL.